(No Model.) 2 Sheets—Sheet 1.
W. HILLMAN.
APPARATUS FOR MANUFACTURING HELICALLY COILED SHEET METAL TUBES.
No. 556,979. Patented Mar. 24, 1896.
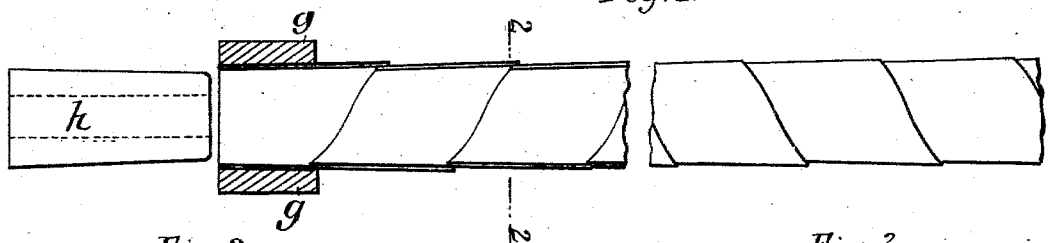
Fig. 1.
Fig. 2. Fig. 3.
Fig. 4.
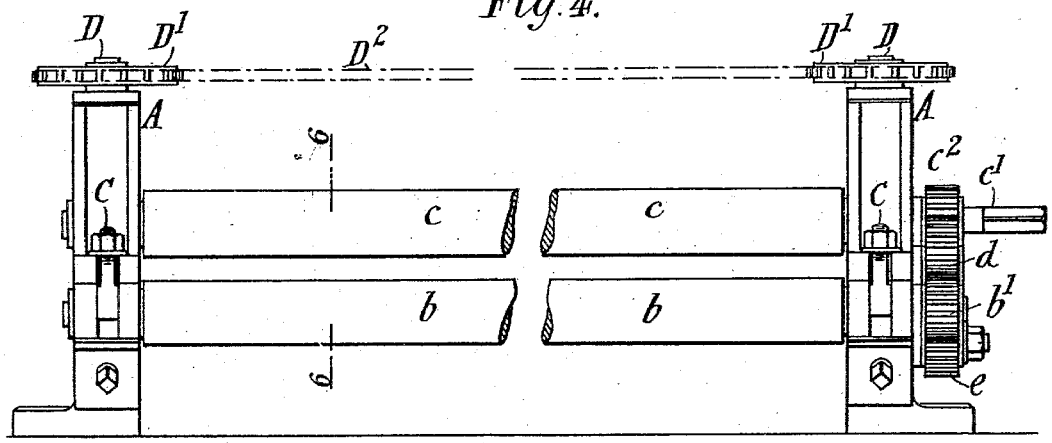
Fig. 5. Fig. 6.
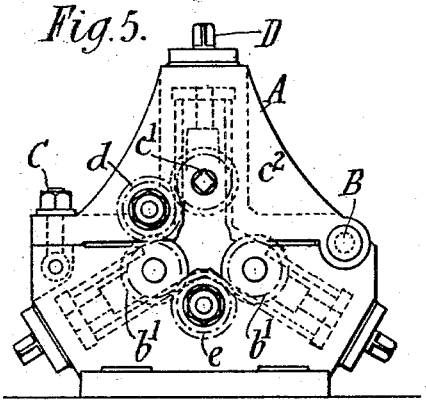
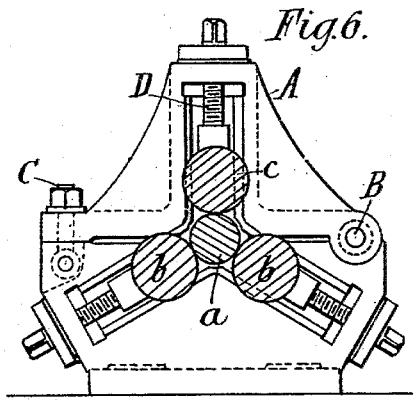
Witnesses: Walter E. Allen. James W. White.
Inventor: William Hillman. By [signature] Attorneys.

(No Model.) 2 Sheets—Sheet 2.

W. HILLMAN.
APPARATUS FOR MANUFACTURING HELICALLY COILED SHEET METAL TUBES.

No. 556,979. Patented Mar. 24, 1896.

Witnesses
Walter E. Allen
Jay W. White

Inventor
William Hillman
By Knight Bros.
Attorneys

UNITED STATES PATENT OFFICE.

WILLIAM HILLMAN, OF COVENTRY, ENGLAND.

APPARATUS FOR MANUFACTURING HELICALLY-COILED SHEET-METAL TUBES.

SPECIFICATION forming part of Letters Patent No. 556,979, dated March 24, 1896.

Application filed April 20, 1895. Serial No. 546,535. (No model.)

*To all whom it may concern:*

Be it known that I, WILLIAM HILLMAN, a subject of the Queen of Great Britain, residing at Coventry, in the county of Warwick, England, have invented a new and useful Apparatus for the Manufacture of Helically-Coiled Sheet-Metal Tubes, of which the following is a specification.

The invention relates to improvements in means employed in the manufacture of helically-coiled sheet-metal tubes, and is represented in the accompanying drawings, in which—

Figure 7:
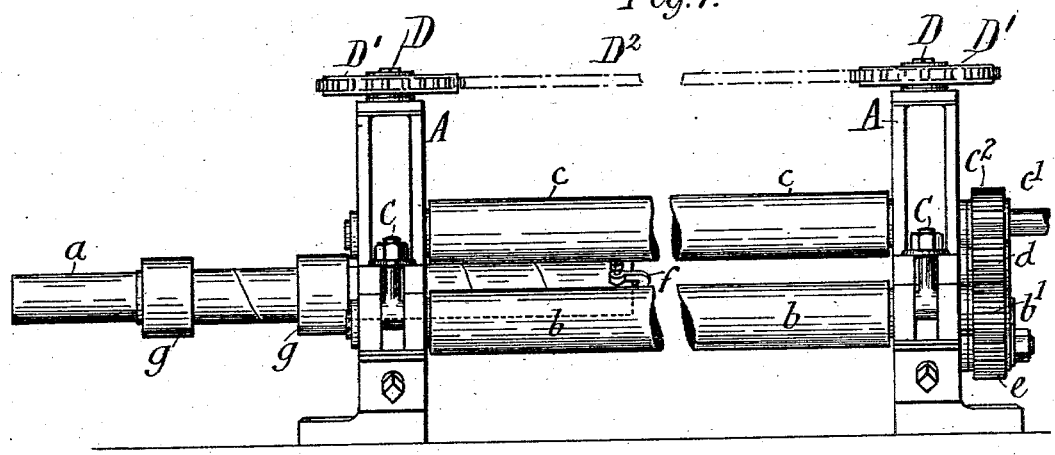
Figure 8:
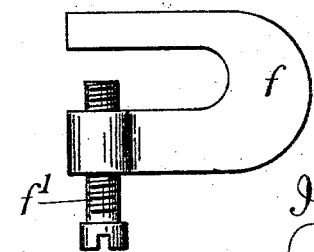

Figure 1 is partly a longitudinal section and partly an external view of the class of tube to which my invention relates, showing the method of holding the same securely at its ends during the process of soldering or brazing. Fig. 2 is a cross-section on the line 2 2 of Fig. 1. Fig. 3 is an end view of Fig. 1. Fig. 4 is a side elevation, Fig. 5 is an end view, and Fig. 6 is a cross-section on the line 6 6 of Fig. 4, of apparatus for coiling the tubing. Fig. 7 is a side view of parts of the machine shown at Figs. 4, 5, and 6, illustrating the application of a cramp and retaining-collars to the tube coiled therein. Fig. 8 is a side view of a cramp suitable for use in securing the last-coiled end of the tube previous to removing it from the coiling-machine.

The sheet metal employed in the manufacture of the said tubes is cut into ribbons of the required length and width to suit the pitch of coiling, the number of thicknesses of steel required for the walls of the tube, and the length of the latter, and the ribbons have plain cut edges, as they merely overlap and do not fit against each other. The steel ribbon is cut at its ends to such an angle that when coiled into a tube the latter shall have its ends at right angles to its axis.

The next process is to slightly coil the starting end of the strip or ribbon, so that it may lap partly round the mandrel $a$, upon which it is to be coiled in the machine.

For the next operation the upper part A of the machine is raised on its hinges B, situated at the back of the machine, and the mandrel $a$ with the strip or ribbon coiled upon it for about half a convolution is laid on the two lower adjustable rolls, $b\ b$, the strip or ribbon at such time hanging over toward the operator. The upper part A of the machine is then brought again into position on the lower part and there fixed by two clamping-screws and nuts C. The top roll, $c$, is now adjusted by the screws D, which are caused to work simultaneously by means of chain-wheels D′ fixed on their upper ends and by an endless chain D² passing round such wheels. Then, when sufficient friction is caused between the rolls and the strip or ribbon, the latter will be coiled round the mandrel upon the rolls $b\ b$ and $c$, being rotated by a handle fixed to the prolongation $c'$ of the upper roll, $c$. The roll $c$ communicates motion to the rolls $b\ b$ by means of toothed gearing $c^2$, $d$, $b'$, $e$ and $b'$. The strip or ribbon is coiled upon the mandrel $a$, so as to obtain a tube of the required length and with the edges overlapping each other to any required width. The top roll, $c$, is then very slightly raised and the mandrel partly pushed out of the tube thereon from the handle end of the machine. One jaw of a cramp $f$, such as that shown at Fig. 8, is then inserted within that end of the tube from which the mandrel $a$ has been pushed out, and the screw $f'$ in the other jaw of such cramp is then screwed up tightly so as to securely grip the end of the coil. The tube is now pushed out of the machine endwise away from the handle end of the machine, and two collars $g\ g$ of an internal diameter corresponding to the outside diameter of the tube are slipped on, one being placed at one end of the tube and the other at the other end, close against the cramp $f$. In Fig. 7 the tube is shown partly pushed out from the machine with the cramp $f$ fixed at one end and a collar $g$ at the other end, while a second collar is on the intermediate part of the tube in readiness to be pushed along the same as far as the cramp $f$. When the collars $g\ g$ are in their proper positions on the tube, the mandrel is withdrawn entirely from the latter and the upper portion A of the machine is again raised upon its hinges B and the tube removed. The collars $g\ g$ on the tube will prevent its untwisting to any undue extent, so that the cramp $f$ can now be removed and a plug $h$ inserted in that end and driven up tightly, so as to grip the end of the tube between it and the collar $g$, the operator at the same time twisting the tube with his left hand so as to bring the coils as closely together as possible. The tube is now charged with a mixture of borax and spelter mixed well with water, the charge being well spread over the interior of the tube by shaking and oscillating it to and fro. A rather stiffer mixture of the same materials is also made, which is placed round the joints of the tube on the outside. The tube is now ready for brazing, which operation is performed by placing it in a furnace preferably heated to the requisite temperature by gas, so as to effect the brazing of the joints of the tube without injury to the character of the steel.

When the brazing materials have fluxed properly, the tube is grasped by a pair of tongs and pushed backward and forward and rolled over several times in order that the spelter shall get completely round the joints and thereby make the tube perfectly solid.

After removal from the furnace the tube is laid in a bed of lime and covered over with the same material to prevent its cooling too rapidly.

When the tube is cold, the plug $h$ is withdrawn, the collars $g$ $g$ removed, and the ends of the tube cut off perfectly square.

Having fully described my invention, what I desire to claim and secure by Letters Patent is—

1. An apparatus for coiling sheet-metal ribbons into tubes comprising the end frames having fixed lower parts and hinged upper parts, the two adjustable lower rolls, the single top roll, means whereby the upper and lower parts of the frames are fastened together, the screws whereby said adjustable top roll is adjusted, having chain-wheels, the endless chain whereby the chain-wheels are connected, and gearing whereby the three rollers are connected and caused to rotate in unison in the same direction; substantially as described.

2. An apparatus for coiling sheet-metal ribbons into tubes comprising the end frames having fixed lower parts and hinged upper parts, the two adjustable lower rolls, the single top roll, the clamping-screws and nuts whereby the upper parts and lower parts of the frames are fastened together, the screws whereby said adjustable top roll is adjusted, having chain-wheels, the endless chain whereby the chain-wheels are connected, and the toothed gearing whereby the three rollers are connected and caused to rotate in unison in the same direction; substantially as described.

WILLIAM HILLMAN.

Witnesses:
M. WILKS,
FRED SHARPE.